(12) United States Patent
Tsai (10) Patent No.: US 8,453,090 B2
(45) Date of Patent: May 28, 2013

(54) SYSTEM AND METHOD FOR OPTIMIZING LOGIC TIMING

(75) Inventor: Cheng-Hong Tsai, Zhubei (TW)

(73) Assignee: Global Unichip Corp., Hsin-Chu (TW)

( * ) Notice: Subject to any disclaimer, the term of this patent is extended or adjusted under 35 U.S.C. 154(b) by 8 days.

(21) Appl. No.: 12/909,048

(22) Filed: Oct. 21, 2010

(65) Prior Publication Data

US 2012/0102447 A1    Apr. 26, 2012

(51) Int. Cl.
*G06F 17/50*    (2006.01)

(52) U.S. Cl.
USPC .......................................... 716/114; 716/108

(58) Field of Classification Search
USPC ................................. 716/108, 114
See application file for complete search history.

(56) References Cited

U.S. PATENT DOCUMENTS

| | | | |
|---|---|---|---|
| 5,259,006 A | 11/1993 | Price et al. | |
| 5,475,605 A | 12/1995 | Lin | |
| 6,553,338 B1 | 4/2003 | Buch et al. | |
| 6,701,498 B2 * | 3/2004 | Becker et al. | 716/108 |
| 6,990,646 B2 | 1/2006 | Yoshikawa | |
| 7,243,323 B2 | 7/2007 | Williams et al. | |
| 2001/0007144 A1 * | 7/2001 | Terazawa | 716/6 |
| 2003/0088838 A1 * | 5/2003 | Becker et al. | 716/6 |
| 2008/0052652 A1 * | 2/2008 | Walian et al. | 716/6 |
| 2010/0175037 A1 * | 7/2010 | Mizutani et al. | 716/6 |

* cited by examiner

*Primary Examiner* — Thuan Do
*Assistant Examiner* — Mohammed Alam
(74) *Attorney, Agent, or Firm* — Slater & Matsil, L.L.P.

(57) ABSTRACT

In an embodiment, a system for optimizing a logic circuit is disclosed. The system is configured to identify an input of a logic circuit cell that violates a timing condition. The input of the logic circuit is coupled to a plurality of logic paths having at least one level of logic. The system is also configured to identify a last node along one of the plurality logic path that violates the timing condition, and insert a buffer at least one node before the last node along the one of the plurality of logic paths that violates the timing condition. The buffer also has a delay optimized to fix the timing condition.

21 Claims, 7 Drawing Sheets

PRIOR ART

SYSTEM AND METHOD FOR OPTIMIZING LOGIC TIMING

TECHNICAL FIELD

This invention relates generally to semiconductor circuits, and more particularly to a system and method for optimizing logic timing.

BACKGROUND

One of the steps in the synthesis of logic circuits on an integrated circuit is the optimization of timing paths, in particular, the optimization of setup and hold times on sequential circuits. For a typical register in a sequential logic circuit having a data input and clock input, the data input generally needs to be in a stable state before, during and after the clock transition in order to register to successfully clock the data input. The time during which the data needs to be held prior to the clock transition is the setup constraint, and the time during which the data needs to be held after the clock transition is the hold constraint.

Ensuring that a particular logic design meets all setup and hold constraints is generally performed using a computer aided timing optimization tool, which first performs a timing analysis taking into account device and gate characteristics and layout parasitics. The timing optimization tool then inserts a delay buffer immediately prior to a data input of a latch or register that violates a hold constraint. By delaying the data signal, the delay buffer delays a signal transition long enough so that the hold constraint is met. Such an approach is suitable for simple designs, for example, a data register having a single incoming data path.

In more topologically complex designs, for example, where a register input has multiple paths and sources, timing optimization becomes more challenging. If a logic path to a single register input has two input paths, for example, a short delay path and a long delay path where the transition edge arrives earlier for the short delay path than for the long delay path, inserting a delay buffer to compensate for the a violation of the hold constraint for the short delay path may violate the setup constraint for the long delay path.

What is needed are systems and methods of optimizing timing paths of sequential circuits.

SUMMARY OF THE INVENTION

In one embodiment, a system for optimizing a logic circuit is disclosed. The system is configured to identify an input of a logic circuit cell that violates a timing condition. The input of the logic circuit is coupled to a plurality of logic paths having at least one level of logic. The system is also configured to identify a last node along one of the plurality logic path that violates the timing condition, and insert a buffer at least one node before the last node along the one of the plurality of logic paths that violates the timing condition. The buffer also has a delay optimized to fix the timing condition.

In another embodiment, method of optimizing a logic circuit is disclosed. The method includes providing a logic circuit that has cells and performing a static timing analysis of the logic circuit. The method also includes identifying an input of a logic circuit cell that violates a timing condition, where the logic cell has an input coupled to a logic path having at least one level of logic. A last node along the logic path that violates the timing condition is identified, and a buffer is inserted to fix the timing condition, where inserting includes placing the buffer at least one node before the last node along the logic path that violates the timing condition.

In a further embodiment, a method of designing a logic circuit is disclosed. The method includes providing a first logic circuit, the first logic circuit having a cell with an input coupled to a plurality of logic paths. An arrival window is defines and a timing analysis of the first logic circuit is performed. The method also includes identifying a hold time violation path from the plurality of logic paths based on the timing analysis, and determining a magnitude of a hold time violation along nodes of the hold time violation path, where determining the magnitude includes a path. Tracing the path includes determining an early arrival time and a late arrival time on a node of the hold time violation path, and stopping the path tracing if a difference between the late arrival time and the early arrival time is greater than an arrival threshold The foregoing has outlined, rather broadly, features of the present invention. Additional features of the invention will be described, hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of embodiments of the present invention and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

The present invention will be described with respect to embodiments in a specific context, namely a system and method for optimizing setup and hold constraints for a logic circuit. Embodiments of this invention may also be applied to signal timing optimization of other circuits and systems.

Figure 1:
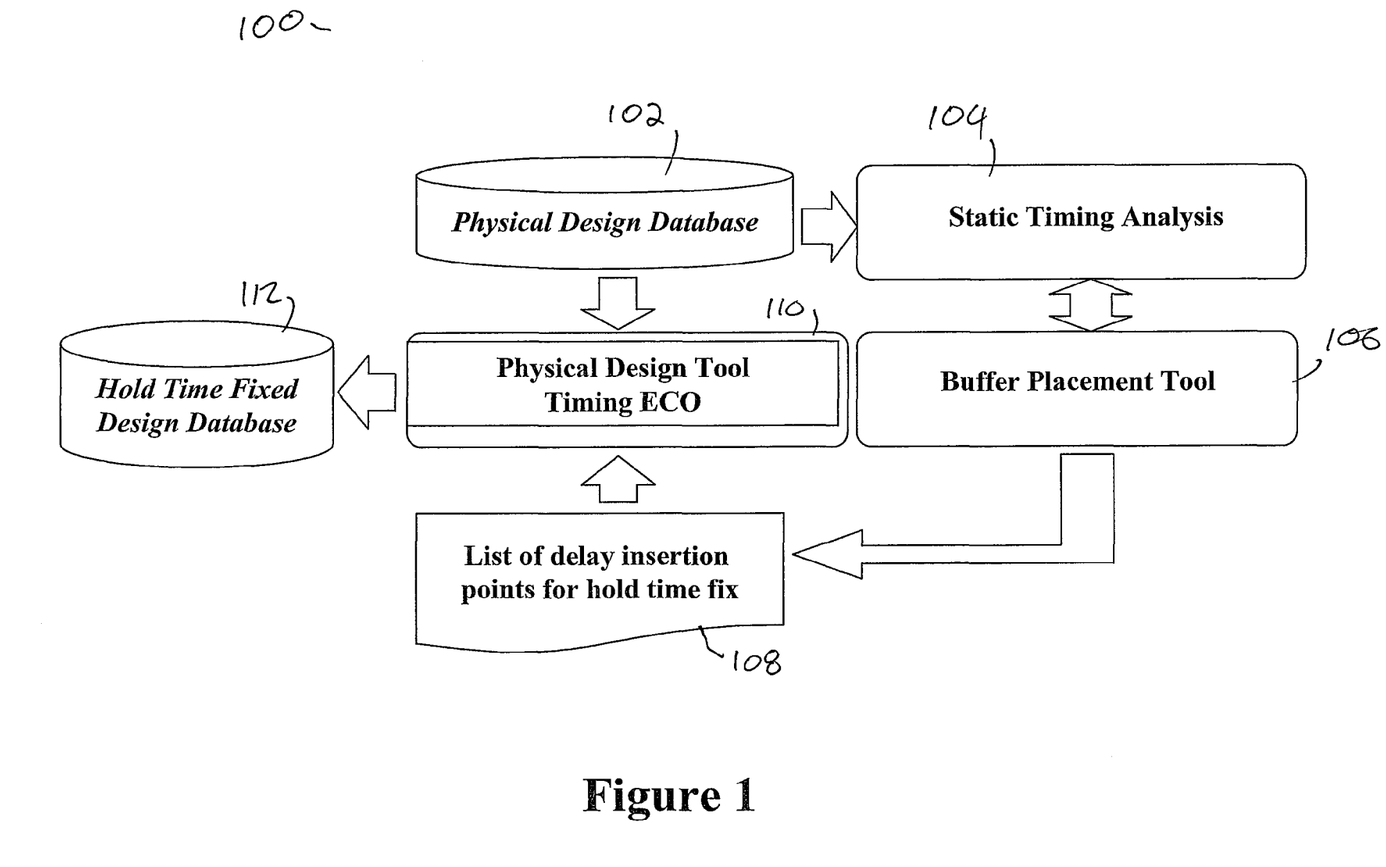
FIG. 1 illustrates an embodiment logic timing optimization system.

FIG. 1 shows a block diagram illustrating embodiment timing optimization system 100. Physical design database 102 represents a logical circuit design that is unoptimized with respect to clock and data timing and serves as an input to physical design tool timing ECO (engineering change order) and to static timing analysis block 104. An embodiment physical design database 102 is preferably in a computer readable form such as Verilog, DEF, and SPEF which describes timing, logical and/or electrical characteristics of the logic circuit and their cells as well as their connectivity. Alternatively, other database formats can be used. Static timing analysis block 104 is a commercially available static timing analysis tool such as Synopsys PrimeTime or Cadence ETS. Alternatively, a custom designed static timing analysis tool can be used or a tool that uses techniques besides static timing analysis such as Synopsys ICC, Cadence SOCE, or Magma Talus can be used.

In embodiments of the present invention, buffer placement tool 106 determines where to place delay compensation buffers within physical design database 102 so that setup and hold constraints are met. In some embodiments, only the hold constraint or the setup constraint is considered. In further embodiments, other timing constraints or combinations thereof can be considered. Buffer placement tool 106 generates list of delay insertion points 108. Setup and hold constraints are typically defined in library timing models for sequential cells such as flop flops and memory. In some embodiments of the present invention, Synopsis Liberty format is used to describe models cell delays and timing constraints. Timing constraint information is generally created independently for cell libraries in embodiments of the present invention. Alternatively, timing constraints can be derived by other methods, for example by circuit simulation to characterize setup/hold timing requirements.

Physical design tool timing ECO tool 110 takes physical design database 102 and list of delay insertion points 108, and optimizes the buffer size and/or time delays of buffer placed at the locations in the list of delay insertion points 108. Physical design tool timing ECO 110 then modifies physical design database 102 to form optimized design database 112. In embodiments of the present invention, physical design tool timing ECO tool 110 is preferably a commercially available tool such as Synopsys ICC, Cadence SOCE, or Magma Talus; however, in alternative embodiments of the present invention, other custom or proprietary tools can be used. Optimized design database 112 is preferably in the same format as unoptimized physical design database 102; however, in alternative embodiments of the present invention, other formats can be used.

Figure 2A:
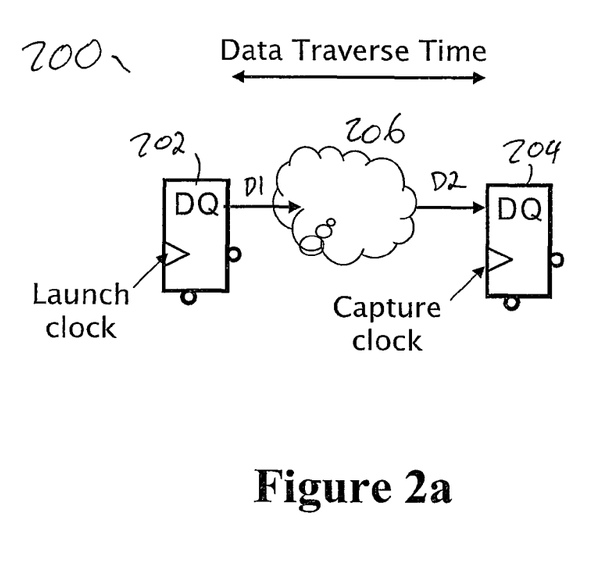
FIG. 2*a* illustrates an embodiment sequential logic circuit.

FIG. 2a illustrates representative sequential logic circuit 200 having a first register 202 clocked with a launch clock and second register 204 clocked with a capture clock. Signal D1 at the output of first register 202 changes state at the rising edge of the launch clock and is delayed by transmission delay 206. Transmission delay 206 is representative of a total delay caused, for example, by buffers, logic gates and parasitic capacitance. Signal D2, which is a delayed version of signal D1, forms a data input to second register 204, and is clocked by the rising edge of the capture clock.

It should be noted that representative sequential logic circuit 200 is presented for the purpose of illustration and can be representative of any form of clocked logic, for example, a latch. Some embodiments of the present invention are targeted toward optimizing custom logic with synchronous circuits that are constrained by setup and hold time requirements. Typically, a custom design includes combinational gates and sequential flip-flops. Memory macros instantiated in the custom design also contain sequential circuits that correspondingly have setup and hold timing requirements. Sequential logic can also be arranged as pipeline logic. At one pipeline stage of a sequential circuit, the launch clock triggers sending pipelined data (from the starting flip-flop), and the capture clock triggers receiving (at the endpoint flip-flop).

The setup and hold constraint is a characteristic for a sequential element, and depends on the element's cell complexity. For a flip-flop, the setup and hold constraint is generally from tens of pico-seconds to hundreds of pico-seconds. For memory macros, the constraint may be as high as the nano-second range. A long path is a relative concept in the sequential design. The clock period defines the circuit speed and the allowable data traverse time along data path. Generally, the long path is setup critical path, that is, the data traverse time is long and is approaching or already violating the allowable setup requirement. In alternative embodiments of the present invention, other timing and delay ranges may be possible depending on the application and its specifications.

Figure 2B:
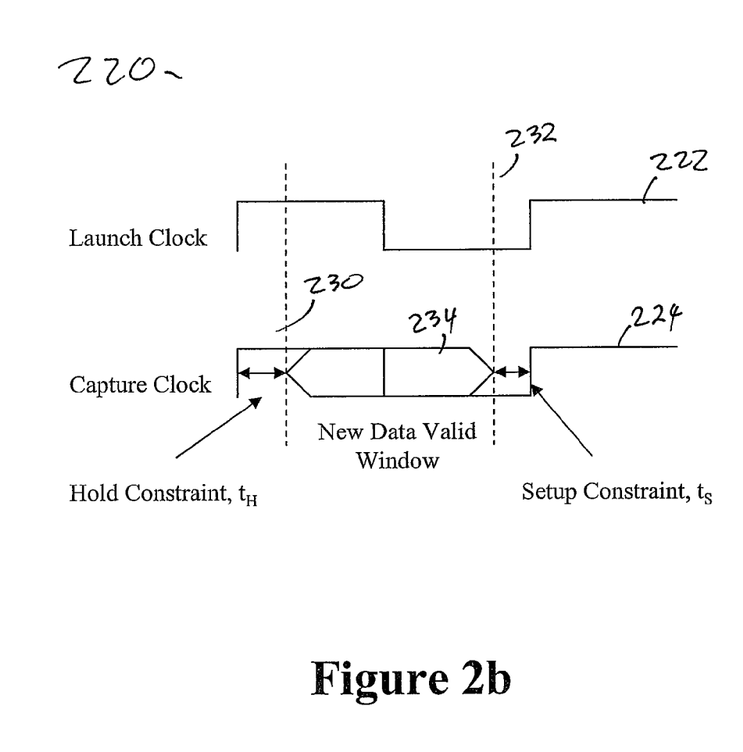
FIG. 2*b* illustrates an embodiment sequential logic circuit timing diagram.

FIG. 2b illustrates a waveform diagram 220 of representative sequential logic circuit 200 of FIG. 2a. In order for second register 204 to successfully clock the output of first register 202, the incoming data transition to second register 204 occurs within new data valid window 234. The new data valid window is defined to start at hold constraint, $t_H$ after the rising edge of the capture clock 224 and end at setup constraint $t_S$ before the next rising edge of capture clock 224. The delay $t_D$ from the output of the first register 202 to the data input of second register 204, is specified to be at least hold constraint $t_H$, but less than the difference between clock period $t_C$ and setup constraint $t_S$. ($t_F < t_H < t_C - t_S$). If transmission delay 206 is a short delay relative to clock period, the incoming edge will fall close to beginning 230 of data valid window 234. If, on the other hand, transmission delay 206 is a longer delay relative to clock period, the incoming edge will fall closer to end 232 of data valid window 234.

Figure 3:
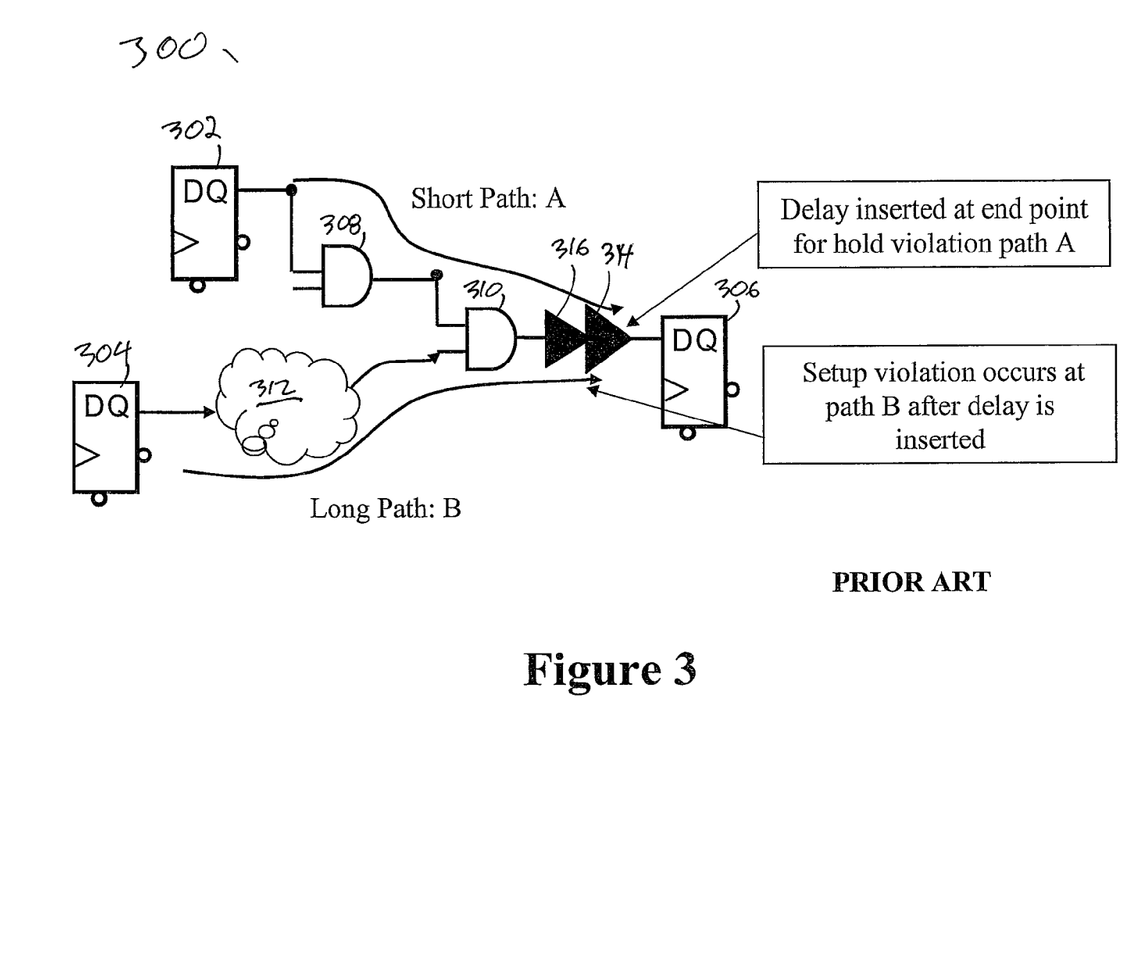
FIG. 3 illustrates sequential circuit using a prior art buffer placement scheme.

FIG. 3 illustrates a representative sequential logic circuit 300 utilizing a buffer placement scheme according to the prior art. Circuit 300 has first register 302 and second register 304 as signal sources, and register 306, which receives the output of registers 302 and 304. The path from the data output of register 302 to the data input of register 306 traverses through gates 308 and 310, while the path from the data output of register 304 to the data input of register 306 traverses through transmission delay 312 and gate 310. In this illustrated example, the delay along path A is shorter than the delay along path B. The prior art logic optimization method inserts buffers 314 and 316 before register 306 in order to compensate for a hold violation on short path A. Buffers 314 and 316, however, also delay the signal of long path B, which may cause a setup violation. Conventional timing optimization schemes, such as the embodiment illustrated in FIG. 3, suffer difficulty during optimization because an optimal fix along one logic path may not be optimal along another logic path. In some situations, there is a "bouncing effect" with respect to the prior art optimization scheme where fixing a hold violation along one path causes a setup violation along another path, and vice versa.

Figure 4:
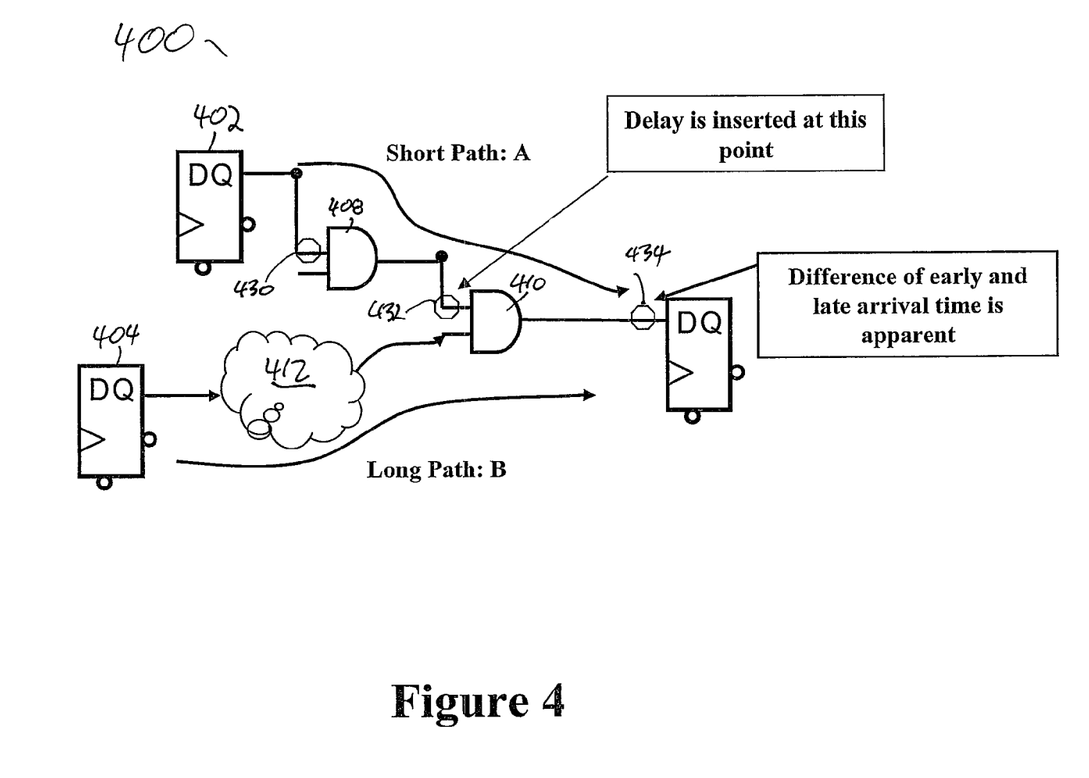
FIG. 4 illustrates sequential circuit using an embodiment buffer placement scheme.

FIG. 4 illustrates a representative sequential logic circuit 400 utilizing a buffer placement scheme according to an embodiment of the present invention. Circuit 400 has first register 402, second register 404 as signal sources, and register 406, which receives the output of registers 402 and 404. The path from the data output of register 402 to the data input of register 406 traverses through gates 408 and 410, while the path from the data output of register 404 to the data input of register 406 traverses transmission delay 412 and gate 410. In this illustrated example, the delay along path A is shorter than the delay along path B. In an embodiment of the present invention, an arrival time window is measured and/or calculated at each point of the transmission path to be compensated. For example, along short path A, the difference between early and late arrival time for all paths is considered at nodes 430, 432 and 434. At node 434, which is the data input to register 406, a wide arrival time window is measurable apparent because of the delay difference between short path A and long path B. At nodes, 430 and 432, however, the arrival time window is narrower because the data output of register 404 is not seen within short path A at these points.

In an embodiment of the present invention, a compensating buffer is inserted a logic level above a last node where a large arrival window is seen. For example, a wide arrival time window is apparent at node 434, but the large window is not apparent one logic level up at node 432 because node 432 is not within long delay path B. An embodiment buffer placement scheme would, therefore, place a compensating buffer at node 432, between logic gate 408 and logic gate 410. By inserting a delay buffer at node 432, a hold violation occurring as a result of a short path will not exacerbate a potential setup time violation as a result of long path B. In an alternative embodiment of the present invention, other nodes along a path can be used, for example, a buffer could be inserted at node 430. It should be appreciated that circuit 400 is only an example of a circuit where an embodiment buffer placement scheme can be applied. Other circuits, for example, of various topologies and different register technologies including latches, static logic, dynamic logic, etc., can be used.

Figure 5:
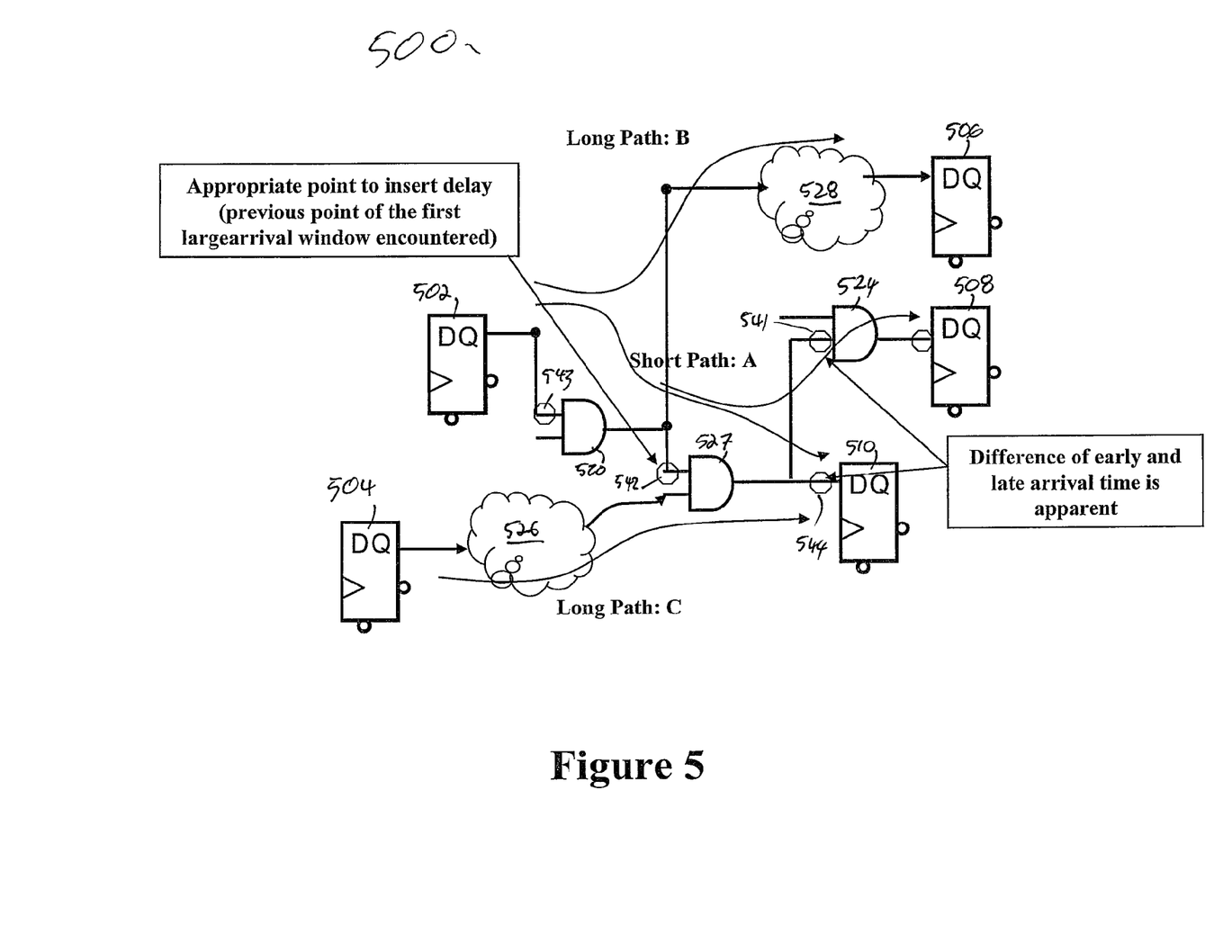
FIG. 5 illustrates sequential circuit using an further embodiment buffer placement scheme.

FIG. 5 illustrates a further representative sequential logic circuit 500 utilizing a buffer placement scheme according to an embodiment of the present invention. More particularly, circuit 500 has multiple transmission paths including short path A and long paths B and C. Transmission path A is a short path emanating from register 502, through gates 520, 522 and 524 and loaded by register 508. Register 510 also loads transmission path A at the output of gate 522. Long path B also emanates from register 502, passes though gate 520 and transmission delay 528, and is loaded by register 506. Long path C emanates from register 504, passes though gate 522 and 524 and is loaded by register 508 and by register 510 at the output of gate 522. Possible buffer insertion points for short path A are node 540 at the input to register 508, nodes 541 and 544 at the inputs of gate 524 and 510 respectively, node 542 at the input of gate 522, and node 543 at the input of gate 520. It can be seen that nodes 540, 541, 544 exist both on long path C and on short path A, thereby giving those points a long arrival window. Point 542, being one logic level up from the last points 544 and 541 with a large arrival window, is therefore a suitable point for buffer insertion according to an embodiment of the present invention. In alternative embodiments, the logic level can be more levels up from last points 544 and 541 with the large arrival windows, for example, point 543.

Figure 6:
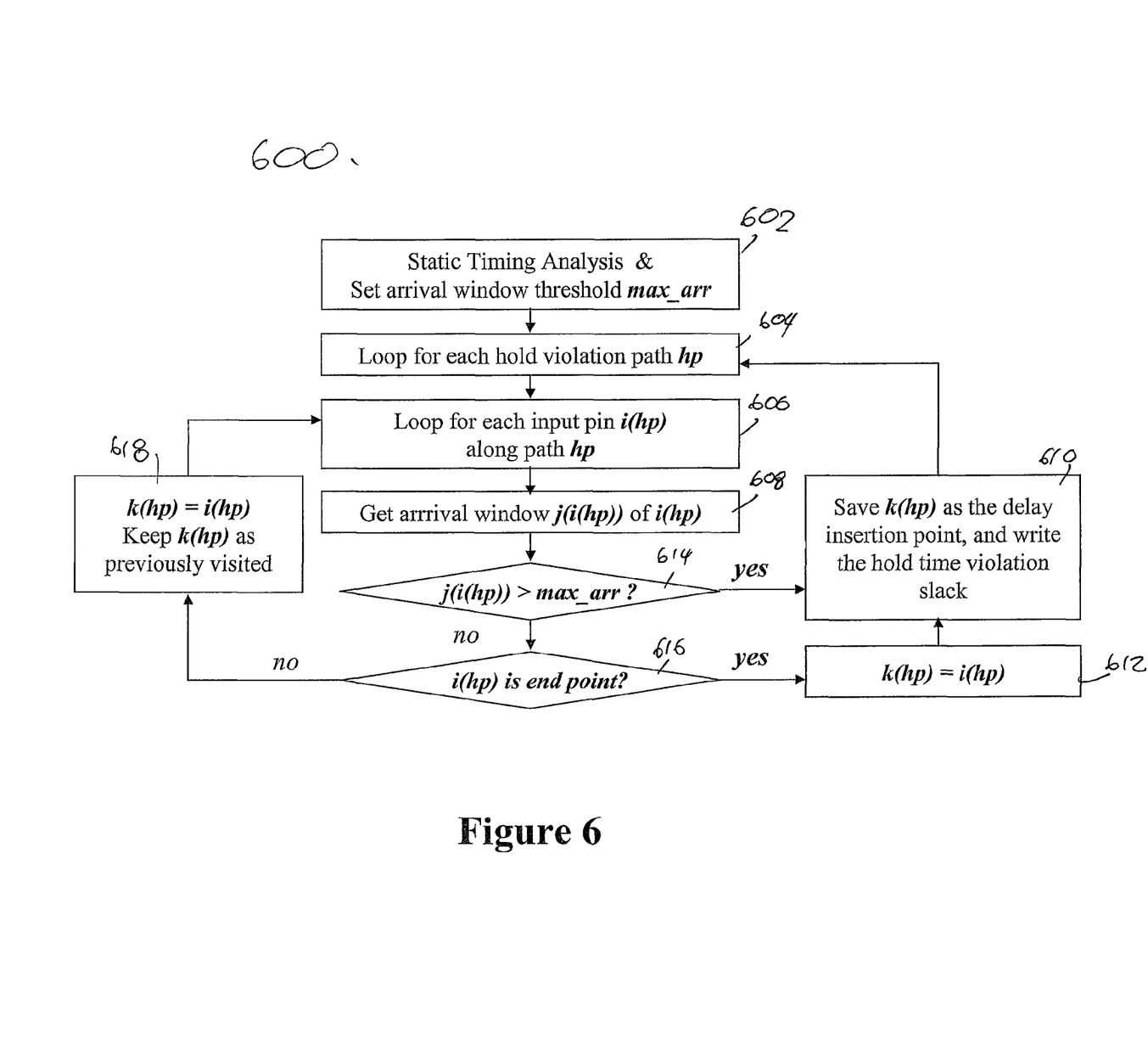
FIG. 6 illustrates a flow chart of an embodiment buffer placement scheme.

FIG. 6 shows a flow chart 600 illustrating an embodiment method of determining buffer insertion locations. During first step 602 in the method, a static timing analysis is performed and the arrival window threshold max_arr is set. In preferred embodiments, the arrival window is about ¼ of a clock cycle; however, other arrival window sizes can be used in alternative embodiments. The static timing analysis is preferably performed using a commercially available analysis tool, such as, Synopsys, PrimeTime or Cadence ETS, however, other tools and methods can alternatively be used. In step 604, hold violation paths are derived by determining which registers violate the hold criterion from the static timing analysis, and the hold paths are by tracing from source registers to destination registers according to methods described hereinabove, and an iterative loop is setup for each hold path that violates the hold criterion.

In step 606, which is within the hold path violation loop, a loop is setup that successively considers each input pin i(hp) along a particular identified hold violation path hp. In step 608, an arrival window j(i(hp)) is calculated for input pin i(hp). In step 614, arrival window j(i(hp)) is compared to max_arr. If j(i(hp)) is greater than max_arr, then point k(hp), the previous visited node, is saved as the delay insertion point in step 610 and control of the method flows to step 604 in which a new hold path violation is considered. If j(i(hp)) is not greater than max_arr, then step 616 determines whether the current input pin i(hp) is an end point (i.e. the last input in the hold violation path). If it is, then the current input pin is set as the delay insertion point in step 612 by setting pin k(hp)=i (hp), and then by saving k(hp) in step 610. If i(hp) is not an end point, then k(hp) is set to i(hp) in step 618 and the next input pin tin the hold violation path begins its evaluation in step 606.

It should be appreciated that embodiments of the present invention can be applied toward a variety of semiconductor processes, and is especially effective for advanced semiconductor processes such as 90 nm, 65 nm and smaller. In these advanced processes, custom design is generally highly integrated, and typical designs may contain complex function blocks having multiple data paths requiring timing optimization. It will also be readily understood by those skilled in the art that materials and methods may be varied while remaining within the scope of the present invention. It is also appreciated that the present invention provides many applicable inventive concepts other than the specific contexts used to illustrate embodiments. Accordingly, the appended claims are intended to include within their scope such processes, machines, manufacture, compositions of matter, means, methods, or steps.

What is claimed is:

1. A method of optimizing a logic circuit, the method comprising:
   providing a logic circuit, the logic circuit comprising cells;
   performing a static timing analysis of the logic circuit using a computer;
   identifying an input of a logic circuit cell that violates a timing condition, the input coupled to a logic path comprising at least one level of logic, identifying the input of the logic circuit comprising
      determining an early arrival time and a late arrival time at the input of the logic circuit cell that violates the timing condition,
      comparing a difference between the early arrival time and the late arrival time to a threshold, and
      determining that the timing condition is violated if the difference between the early arrival time and the late arrival time is greater than the threshold;
   identifying a last node along the logic path that violates the timing condition; and
   inserting a buffer to fix the timing condition, inserting comprising placing the buffer at least one node before the last node along the logic path that violates the timing condition.

2. The method of claim 1, further comprising identifying the last node along the logic path that violates the timing condition.

3. The method of claim 1, wherein the timing condition comprises a hold condition.

4. The method of claim 1, wherein the timing condition comprises a setup and hold timing window.

5. The method of claim 1, wherein the logic circuit comprises multiple paths.

6. The method of claim 1, wherein the at least one node before the last node comprises one node before the last node.

7. The method of claim 1, wherein:
the method is performed by a computer aided design system; and
the method further comprises providing an optimized logic circuit after inserting the buffer.

8. The method of claim 7, wherein the optimized circuit comprises an integrated circuit layout.

9. A non-transitory computer readable medium with an executable program stored thereon, wherein the program instructs a computer to perform the following steps:
identify an input of a logic circuit cell that violates a timing condition the input coupled to a plurality of logic paths comprising at least one level of logic, wherein the input of the logic circuit is identified to violate the timing condition by
determining an early arrival time and a late arrival time on at the input of the logic circuit cell that violates the timing condition,
comparing a difference between the early arrival time and the late arrival time to a threshold, and
identifying the input of the logic circuit cell as violating the timing condition if the difference between the early arrival time and the late arrival time is greater than the threshold;
identify a last node along one of the plurality logic paths that violates the timing condition; and
insert a buffer at least one node before the last node along the one of the plurality of logic paths that violates the timing condition, the buffer comprising a delay that fixes the violation of the timing condition.

10. The non-transitory computer readable medium of claim 9, wherein the timing condition comprises a hold condition.

11. The non-transitory computer readable medium of claim 9, wherein the timing condition comprises a setup and hold window.

12. The non-transitory computer readable medium of claim 9, wherein the program further instructs the computer to perform a static timing analysis of the logic circuit.

13. The non-transitory computer readable medium of claim 9, wherein:
the program further instructs the computer to perform a static timing analysis of the logic circuit; and
the static timing analysis is used to identify the input of the logic circuit that violates the timing condition.

14. The non-transitory computer readable medium of claim 9, wherein:
the at least one node before the last node along the one of the plurality of logic paths comprises one node before the last node; and
the timing condition comprises a setup and hold window.

15. A method of designing a logic circuit, the method comprising:
providing a first logic circuit, the first logic circuit comprising a cell, the cell having an input coupled to a plurality of logic paths;
defining an arrival threshold;
performing a timing analysis of the first logic circuit using a computer;
identifying a hold time violation path from the plurality of logic paths based on the timing analysis; and
determining a magnitude of a hold time violation along nodes of the hold time violation path, wherein determining the magnitude comprises tracing a path, tracing comprising
determining an early arrival time and a late arrival time on a node of the hold time violation path,
comparing a difference between the early arrival time and the late arrival time to the arrival threshold, and
stopping tracing the path if a difference between the late arrival time and the early arrival time is greater than the arrival threshold.

16. The method of claim 15, wherein tracing the path comprises testing the nodes of the hold time violation path starting from the input to the cell and progressing through levels of logic preceding the cell.

17. The method of claim 15, further comprising identifying a buffer location node to be a last node visited prior to stopping tracing the path.

18. The method of claim 17, further comprising:
inserting a compensating buffer to fix the hold violation at the buffer location; and
creating a second logic circuit, the second logic circuit comprising the first logic circuit and the compensating buffer.

19. The method of claim 15, wherein the timing analysis comprises a static timing analysis.

20. The method of claim 15, wherein the arrival threshold is less than about ¼ of a clock cycle.

21. The method of claim 1, wherein the threshold is less than about ¼ of a clock cycle.

* * * * *